United States Patent [19]

Oikawa et al.

[11] Patent Number: 4,699,845

[45] Date of Patent: Oct. 13, 1987

[54] EASILY-ADHESIVE POLYESTER FILM

[75] Inventors: Tatuo Oikawa, Otsu; Takao Izasa, Moriyama; Kazuo Okabe, Shiga, all of Japan

[73] Assignee: Toray Industries, Inc., Tokyo, Japan

[21] Appl. No.: 845,270

[22] PCT Filed: Jul. 4, 1985

[86] PCT No.: PCT/JP85/00379

§ 371 Date: Mar. 7, 1986

§ 102(e) Date: Mar. 7, 1986

[87] PCT Pub. No.: WO86/00572

PCT Pub. Date: Jan. 30, 1986

[30] Foreign Application Priority Data

Jul. 9, 1984 [JP] Japan ................... 59-140704

[51] Int. Cl.$^4$ ............ G11B 5/64; G11B 5/66; B32B 27/18; B32B 27/36

[52] U.S. Cl. ................. 428/480; 360/134; 428/694; 428/900

[58] Field of Search ........... 428/480, 694, 900; 360/134

[56] References Cited

U.S. PATENT DOCUMENTS 3,779,993  12/1973  Kibler et al. ............ 528/295
4,590,119  5/1986   Kawakami et al. ........ 428/480

FOREIGN PATENT DOCUMENTS 0029620  6/1981  European Pat. Off. .
0033783  8/1981  European Pat. Off. .

OTHER PUBLICATIONS

Supplementary European Search Report (Appln EP 85903381) Annex to European Search Report (EP 85903381).

Chem. Abstracts, 92:148141s, Watanabe, H., "Laminated Polyester Films".

Primary Examiner—William J. Van Balen
Attorney, Agent, or Firm—Birch, Stewart, Kolasch & Birch

[57] ABSTRACT

The present invention relates to an easily-adhesive polyester film comprising a polyester base film and a coating layer formed on one surface of the polyester base film, the coating layer comprising a mixture composed mainly of a higher fatty acid wax and a copolyester comprising as one comonomer component an alkali metal salt of an ester-forming aromatic sulfonic acid.

The film of the present invention has excellent adhesiveness and has an improved anti-blocking property, and the film of the present invention is valuable as a base film for a magnetic recording medium, a capacitor or a photographic film.

24 Claims, 1 Drawing Figure

EASILY-ADHESIVE POLYESTER FILM

DESCRIPTION

1. Technical Field

The present invention relates to an easily-adhesive polyester film that is excellent in the bondability.

More particularly, the present invention relates to an easily-adhesive polyester film having a coating layer formed on one surface of a polyester film.

2. Background Art

Recently, polyester films have been broadly used as bases for magnetic media such as magnetic tapes and magnetic disks, capacitors and photographic films.

In the application fields of polyester films, it is required that the bondability be good. For example, when a polyester is used as a base of a magnetic tape, a good adhesion is necessary between the polyester base film and the magnetic layer. However, a polyester film itself, especially a biaxially stretched film of polyethylene terephthalate, is poor in the bondability, and various studies have been made so as to improve the bondability. As means for improving the bondability of a polyester film, there is known a corona discharge treatment of the film surface, an ultraviolet ray irradiation treatment of the film surface and a plasma treatment of the film surface. However, these treatments are defective in that the resulting bondability is not sufficient and the bondability changes with the passing of time. Furthermore, there is known a method in which a urethane resin or acrylic resin is coated on the surface of a polyester film. However, when this coated polyester film is wound on a roll, laps of the film adhere to each other and so-called blocking is caused, resulting in reduction of the operation efficiency and breakage of the film.

It is therefore a primary object of the present invention to provide an easily-adhesive polyester film in which the above-mentioned defects of the conventional techniques are eliminated and the bondability and blocking resistance are improved.

DISCLOSURE OF THE INVENTION

According to the present invention, the above object is attained by an easily-adhesive polyester film comprising a polyester base film and a coating layer formed on one surface of the polyester base film, the coating layer comprising a mixture composed mainly of a copolyester comprising as one comonomer component an alkali metal salt of an ester-forming aromatic sulfonic acid and a higher fatty acid wax.

BEST MODE FOR CARRYING OUT THE INVENTION

Figure 1:
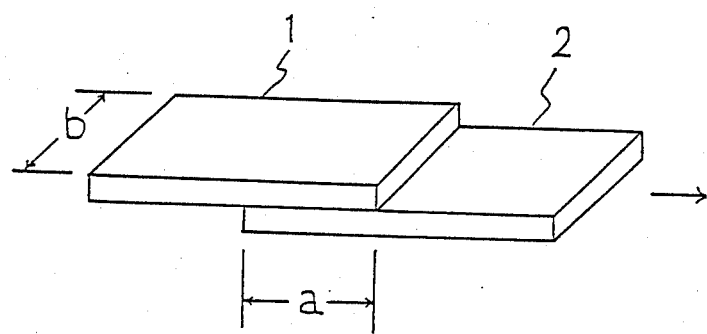
FIG. 1 is a perspective view showing the manner of lapping a film and the direction of the force when the force of separating the laps of the film from each other is measured.

In the present invention, the copolyester comprising the alkali metal salt as one comonomer component is a copolyester obtained by polycondensing (A) a dicarboxylic acid or an ester-forming derivative thereof with (B) a glycol. An alkali metal salt of an ester-forming aromatic sulfonic acid is copolymerized as a part of the dicarboxylic acid or its easter-forming derivative as the component (A).

It is preferred that the component (A) should comprise at least 60 mole% of an aromatic dicarboxylic acid or an ester-forming derivative thereof and 7 to 40 mole% (especially 10 to 20 mole%) of an alkali metal salt of an ester-forming aromatic sulfonic acid or an ester-forming derivative thereof and that the component (B) should comprise at least 40 mole% of an aliphatic or alicyclic glycol. Furthermore, diethylene glycol or triethylene glycol may be used in an amount of 1 to 60 mole%, preferably 1 to 18 mole%, as a part of the glycol component (B). The bondability can be improved by using a copolyester having the above-mentioned composition.

As the aromatic dicarboxylic accid component forming the copolyester of the present invention, there can be mentioned terephthalic acid, isophthalic acid, phthalic acid, 2,5-dimethylterephthalic acid, 1,4-naphthalene-dicarboxylic acid, biphenyldicarboxylic acid, 2,6-naphthalene-dicarboxylic acid, 1,2-bis(phenoxy)-ethane-p,p'-dicarboxylic acid, and ester-forming derivatives thereof. As the ester-forming derivative, there are generally used lower alkyl esters of these dicarboxylic acids wherein said lower alkyl group has 1 to 5 carbon atoms, and halogenides of these dicarboxylic acids.

As the alkali metal salt of the ester-forming aromatic sulfonic acid, there can be mentioned alkali metal salts (alkali metal sulfonates) of sulfoterephthalic acid, 5-sulfoisophthalic acid, 4-sulfophthalic acid, 4-sulfonaphthalene-2,7-dicarboxylic acid, sulfo-p-xylylene glycol and 2-sulfon-1,4-bis(hydroxyethoxy)benzene, and ester-forming derivatives thereof.

Among these alkali metal salts of the ester-forming sulfonic acids, 5-sodium sulfoisophthalate, sodium sulfoterephthalate and ester-forming derivatives thereof are especially preferred.

As the glycol component forming the copolyester of the present invention, there can be mentioned aliphatic glycols having 2 to 10 carbon atoms and alicyclic glycols having 6 to 10 carbon atoms. For example, ethylene glycol, 1,3-propane diol, 1,4-butane diol and 1,4-cyclohexane dimethanol are preferably used. At least one member selected from diethylene glycol and triethylene may be used as a part of the glycol component according to need.

Known higher fatty acid waxes can be used. Generally, a wax comprising as the main component an aliphatic ester compound of a higher fatty acid having 12 to 35 carbon atoms, especially 17 to 33 carbon atoms, with an alcohol having 15 to 35 carbon atoms, especially 17 to 33 carbon atoms, is preferably used. An alcohol having a valency of 1 to 3 is ordinarily used as the alcohol component. As specific examples of the higher fatty acid wax, there can be mentioned waxes such as shellac wax, bran wax, insect wax, wool wax, carnauba wax, montan wax, candelilla wax and synthetic waxes, and products formed by substituting a part or all of the fatty acid ester with other alcohol components in these waxes and modification products formed by converting a part or all of the fatty acid ester to a salt of an alkali metal such as sodium or potassium or an alkaline earth metal such as calcium, magnesium or barium. Carnauba wax and montan wax are especially preferred. The higher fatty acid waxes may be used in the form of an aqueous dispersion prepared by using an emulsifier or the like or in the form of a fine powder.

In the present invention, the coating film (coating layer) is formed of a mixture composed mainly of (comprising as main components) the above-mentioned copolyester and the above-mentioned higher fatty acid wax. By the term "mixture composed mainly of the copolyester and wax", it is meant that the mixture of the copolyester and the wax is contained in the coating layer in an amount of at least 90% by weight, preferably at least 95% by weight.

In order to improve the bondability and the anti-blocking property, it is preferred that the mixing ratio between the copolyester and wax in the mixture to be used in the present invention be such that the copolyester occupies 70 to 99.9% by weight, especially 85 to 99% by weight, of the mixture and the wax occupies 0.1 to 30% by weight, especially 1 to 15% by weight, of the mixture.

It is preferred that the mixture of the copolyester and wax be coated in the state dissolved or dispersed in a solvent such as water or an appropriate organic solvent on the polyester base film.

The thickness of the coating layer is not particularly critical, but it is preferred that the thickness of the coating layer be 0.001 to 1 $\mu$m, especially 0.01 to 0.1 $\mu$m.

The polyester base film used in the present invention is a polyester film formed by a known method, that is, a film obtained by extruding a melt of a polyester in the form of a sheet or a tube and stretching the extrudate in at least one direction. From the viewpoint of the mechanical characteristics, there are preferably used an ordinary balanced type film which is biaxially stretched, a tensilized type film which is biaxially stretched and is uniaxially strengthened, and a tensilized type film which is biaxially stretched and is biaxially strengthened. The thickness of the base film is not particularly limited but is changed according to the intended use. Ordinarily, however, a base film having a thickness of 5 to 50 $\mu$m is used. It is preferred that the surface of the polyester base film be smooth. More specifically, it is preferred that the surface roughness of the base film be such that the value Ra is 0.003 to 0.030 $\mu$m as measured at a cut-off value of 0.25 mm by a stylus type surface roughness tester.

Incidentally, the value Ra is an arithmetic mean of the absolute values of the heights and lowest points of the roughness curve, obtained by removing waviness from the curve of the cross section determined by using the stylus type surface roughness meter by using an appropriate cut-off value, to the central line (which is determined so that the area of the portion above the central line is equal to the area of the portion below the central line) (according to DIN 4768).

Any of polymers composed mainly of a linear polyester and capable of forming a self-supporting film can be used as the polyester constituting the base film. As typical instances, there can be mentioned polyethylene terephthalate, polytetramethylene terephthalate, poly-1,4-cyclohexylene-dimethylene terephthalate, polyethylene-2,6-naphthalene-dicarboxylate and polyethylene-p-hydroxybenzoate.

The polyester may be a homopolyester or a copolyester, but a homopolyester is preferred. As the comonomer used in case of a copolyester, there can be mentioned diol components such as diethylene glycol, propylene glycol, neopentyl glycol, polyethylene glycol, p-xylylene glycol and 1,4-cyclohexane dimethanol, dicarboxylic acids such as adipic acid, sebacic acid, phthalic acid, isophthalic acid and 2,6-naphthalene-dicarboxylic acid, polyfunctional dicarboxylic acid components such as trimellitic acid and pyromellitic acid, ester-forming derivatives thereof, and p-hydroxyethoxybenzoic acid. In case of the copolyester, it is preferred that the content of the comonomer be up to 20 mole%.

The polyester that is often used is a polyester which is a polycondensation product of (A) a dicarboxylic acid or an ester-forming derivative thereof with (B) a glycol and in which at least 80 mole% of the component (A) is terephthalic acid or its ester-forming derivative and at least 80 mole% of the component (B) is ethylene glycol.

Polyethylene terephthalate is most easily available.

The process for the preparation of the film of the present invention will now be described with reference to a typical embodiment using a polyethylene terephthalate film as the base film, which does not limit the scope of the present invention. Substantially unoriented crystalline polyethylene terephthalate as the starting material is molten at 270° to 290° C. and extruded in the form of a sheet, and the extrudate is cooled and solidified on a casting drum maintained at 20° to 30° C. to form an undrawn sheet. The undrawn sheet is roll-stretched at a stretch ratio of 3.0 to 5.0 in the machine direction, and a coating agent composed mainly of a copolyester and a higher fatty acid wax, as described above, is coated on the uniaxially stretched film by using a metalling bar coater.

The amount coated of the coating agent is changed according to the thickness of the coating layer and the stretch ratio adopted at the subsequent step, and for example, the amount coated of the coating agent is 0.08 g/m$^2$. Then, the film is passed through a tenter and dried and pre-heated at 90° to 120° C., and the film is stretched in the transverse direction at a stretch ratio of 3.0 to 4.0, followed by the secondary machine direction stretching at a stretch ratio of 1.1 to 1.8 according to need. Then, the stretched film is heat-treated at 180° to 230° C. According to this process, a biaxially stretched polyethylene terephthalate film having a coating layer formed thereon is obtained.

The coating agent used in the above process is formed by dissolving the copolyester of the present invention in hot water maintained at 70° to 90° C. to form an aqueous solution having a concentration of 1.0 to 8.0% by weight and mixing this solution with an aqueous dispersion of the higher fatty acid wax so that the copolyester resin/higher fatty acid wax solid weight ratio is in the range of from 70/30 to 99.9/0.1.

According to the present invention, by producing an easily-adhesive polyester film by forming a coating layer comprising a mixture composed mainly of a specific copolyester and a higher fatty acid wax on one surface of a polyester, the following excellent effects can be attained.

(A) An excellent adhesiveness is obtained when other substance is coated on the coated surface. For example, the adhesiveness to a binder containing a magnetic substance is excellent, and therefore, the film of the present invention is suitably used as a base film of a magnetic recording medium.

(B) The anti-blocking property of the film is improved, and even if the film is stored in a state wound in the form of a roll for a long time, laps of the film do not adhere to each other. Accordingly, handling of the film is advantageously facilitated.

The present invention will now be described in detail with reference to the following examples that by no means limit the scope of the invention.

Incidentally, in the examples, all of "parts" are by weight, and the properties were evaluated according to the following methods.

(1) Slipperiness

The static friction coefficient ($\mu s$) was measured at a temperature of 25° C. and a relative humidity of 60% by using a slip tester supplied by Makino Factory.

(2) Adhesiveness

A two-pack type curable polyurethane (Retan #2000 supplied by Kansai Paint Corporation) was coated and dried at 95° C. for 10 minutes, and the peeling test was carried out by using an adhesive cellophane tape (supplied by Nichiban Corporation). The adhesiveness was evaluated according to the following scale.

o: no substantial peeling
Δ: slight peeling
X: considerable peeling
XX: entire peeling (3) Anti-blocking property Two films having a width of 3 cm and also having the coating layer of the present invention formed on one surface were piled as shown in FIG. 1 so that the coating layer-formed surface confronted the coating layer-free surface (in FIG. 1, each of reference numerals 1 and 2 represents the film of the present invention). The pile size was such that "a" in FIG. 1 was 4 cm ("b" was 3 cm). A pressure of 2 Kg/12 cm$^2$ was applied for 24 hours to the entire piled surfaces so that they adhered closely to each other. Incidentally, the measurement atmosphere was maintained at a temperature of 50° C. and a relative humidity of 80%.

The films 1 and 2 were fixed on the non-piled sides and the non-piled sides of the films 1 and 2 were pulled in the direction indicated by an arrow in FIG. 1 at a speed of 300 mm/min. The force required for separating the films 1 and 2 was measured and the value was expressed in the unit of g/12 cm$^2$.

If this separating force is less than 270 g/12 cm$^2$, the film can be practically used without any trouble.

EXAMPLE 1

A copolyester shown in Table 1 was dissolved in hot water maintained at 85° C. to form an aqueous solution having a concentration of 3% by weight. Carnauba wax was incorporated as the water-dispersible higher fatty acid wax into the aqueous solution to form a coating liquid comprising as solids 90% by weight of the copolyester and 10% by weight of the higher fatty acid wax.

Separately, polyethylene terephthalate was melt-extruded on a casting drum maintained at about 20° C. and roll-stretched at a stretch ratio of 3.4 in the machine direction. Then, the above coating liquid was coated on one surface of the polyethylene terephthalate film by a metalling bar coater. The coated film was passed through a tenter oven, dried and pre-heated at 110° C., stretched at a stretch ratio of 3.4 in the transverse direction and heat-treated at 185° C. to obtain an easily-adhesive polyester film having a coating layer formed thereon. The results of the measurement of the properties of the obtained film are shown in Table 1.

Even when the obtained easily-adhesive polyester film was stored in the form of a roll for 6 months, it was found that the bondability was maintained and adhesion of the film laps was not caused, and the excellent effect was maintained.

EXAMPLES 2 THROUGH 8 AND COMPARATIVE EXAMPLES 1 THROUGH 3

One surface of a uniaxially stretched polyethylene terephthalate film prepared in the same manner as described in Example 1 was coated with a liquid mixture formed by mixing an aqueous solution containing 3% by weight of a copolyester shown in Table 1 with a higher fatty acid wax shown in Table 1 at a mixing ratio shown in Table 1. The coated film was stretched at a stretch ratio of 3.4 in the transverse direction in the same manner as described in Example 1 and was then heat-treated in the same manner as described in Example 1 to obtain an easily-adhesive polyester film having a coating layer formed thereon. The results of the measurement of the properties of the film are shown in Table 1. From the results shown in Table 1, it is seen that the films of Example 1 through 8 according to the present invention were excellent in the slipperiness, the adhesiveness and the anti-blocking property.

The films of Comparative Examples 1 through 3, which were outside the scope of the present invention, were insufficient in some of the properties.

TABLE 1

| | Composition of Copolyester | | | | Higher Fatty Acid | | Static Friction Coefficient | Adhesiveness | Anti-blocking Property (g/12 cm$^2$) |
|---|---|---|---|---|---|---|---|---|---|
| | Composition of Dicarboxylic Acids | | Glycol Components | | | | | | |
| | Compounds | Contents (mole %) | Compounds | Contents (mole %) | Compound | Content (% by weight) | | | |
| Example 1 | TPA | 87 | EG | 95 | Carnauba wax | 10 | 0.82 | o | 215 |
| | SI | 13 | DEG | 5 | | | | | |
| Example 2 | TPA | 87 | EG | 95 | Carnauba wax | 5 | 1.06 | o | 250 |
| | SI | 13 | DEG | 5 | | | | | |
| Example 3 | TPA | 87 | EG | 95 | Carnauba wax | 15 | 0.73 | o | 180 |
| | SI | 13 | DEG | 5 | | | | | |
| Example 4 | TPA | 85 | EG | 100 | Carnauba wax | 10 | 0.83 | o | 220 |
| | SI | 15 | DEG | 0 | | | | | |
| Example 5 | TPA | 90 | EG | 95 | Carnauba wax | 10 | 0.82 | o | 215 |
| | SI | 10 | DEG | 5 | | | | | |
| Example 6 | TPA | 80 | EG | 95 | Carnauba wax | 10 | 0.84 | o | 230 |
| | SI | 20 | DEG | 5 | | | | | |
| Example 7 | TPA | 87 | EG | 95 | Montan wax | 10 | 0.82 | o | 205 |
| | SI | 13 | DEG | 5 | | | | | |
| Example 8 | TPA | 87 | EG | 95 | Montan wax | 5 | 1.03 | o | 245 |
| | SI | 13 | DEG | 5 | | | | | |
| Comparative Example 1 | TPA | 87 | EG | 95 | — | 0 | 1.41 | o | 350 |
| | SI | 13 | DEG | 5 | | | | | |
| Comparative Example 2 | TPA | 95 | EG | 95 | — | 0 | 1.44 | Δ~o | 310 |
| | SI | 5 | DEG | 5 | | | | | |
| Comparative | — | — | — | — | — | — | 1.14 | xx | 50 |

TABLE 1-continued

| | Composition of Copolyester | | | | Higher Fatty Acid | | | | |
| | Composition of Dicarboxylic Acids | | Glycol Components | | | Content | Static | | Anti-blocking |
| | Compounds | Contents (mole %) | Compounds | Contents (mole %) | Compound | (% by weight) | Friction Coefficient | Adhesiveness | Property (g/12 cm²) |
| --- | --- | --- | --- | --- | --- | --- | --- | --- | --- |
| Example 3 | — | — | — | — | | | | | |

Note
The Abbreviations in Table 1 indicate the following compounds.
TPA: terephthalic acid
EG: ethylene glycol
SI: 5-sodium sulfoisophthalate
DEG: diethylene glycol

INDUSTRIAL APPLICABILITY

The film of the present invention can be broadly used for magnetic recording media, capacitors and photographic films. Especially, the film of the present invention is valuable as a base film for a magnetic recording medium having a so-called coating type magnetic layer comprising, for example, a binder comprising an acrylic resin or the like and a curing agent such as an isocyanate and a magnetic powder of iron oxide, chromium oxide, Fe, Co, Ni or an alloy thereof. When a magnetic medium is prepared by coating this magnetic layer on a polyester film which is not subjected to the coating treatment of the present invention, a binder having an especially good bondability to the polyester film should be used and the kinds of applicable binders are drastically limited. On the other hand, when the coated film of the present invention is used, the freedom of selection of applicable binders is broadened. Moreover, when the coated film of the present invention is used, the adhesiveness to a magnetic layer is good and occurrence of troubles such as peeling of the magnetic layer can be prevented while the magnetic recording medium is used.

We claim:

1. An adhesive polyester film comprising:
   a polyester base film and
   a coating layer formed on one surface of said polyester base film, said coating layer comprising a mixture of (1) a higher fatty acid wax and (2) a coating layer copolyester which includes as one comonomer component an alkali metal salt of an ester-forming aromatic sulfonic acid.

2. An adhesive polyester film as set forth in claim 1, wherein said polyester base film is a thermoplastic linear polyester.

3. An adhesive polyester film as set forth in claim 1, wherein said polyester base film is a polycondensation product of (A) a dicarboxylic acid or ester component with (B) a glycol component,
   and wherein at least 80 moles percent of component (A) is terephthalic acid or an ester-forming derivative thereof and at least 80 moles percent of component (B) is ethylene glycol.

4. An adhesive polyester film as set forth in claim 1, wherein said polyester base film is polyethylene terephthalate.

5. An adhesive polyester film as set forth in claim 1, wherein said coating layer copolyester is a polycondensation product of (A) a dicarboxylic acid or ester component with (B) a glycol component,
   and wherein percent of component (A) is an alkali metal salt of an ester-forming aromatic sulfonic acid and at least 40 mole percent of component (B) is at least one glycol selected from the group consisting of aliphatic glycols having 2 to 10 carbon atoms and alicyclic glycols having 6 to 10 carbon atoms.

6. An adhesive polyester film as set forth in claim 5, wherein said component (A) includes at least one member selected from the group consisting of 5-sodium sulfoisophthalate, sodium sulfoterephthalate and ester-forming derivatives thereof.

7. An adhesive polyester film as set forth in claim 5, wherein 1 to 60 mole percent of said component (B) is diethylene glycol or triethylene glycol.

8. An adhesive polyester film as set forth in claim 7, wherein 1 to 18 moles percent of said component (B) is diethylene glycol or triethylene glycol.

9. An adhesive polyester film as set forth in claim 1, wherein said coating layer comprises 70 to 99.9 percent by weight of said coating layer copolyester and 0.1 to 30 percent by weight of said higher fatty acid wax.

10. An adhesive polyester film as set forth in claim 1, wherein said coating layer comprises 85 to 99 percent by weight of said coating layer copolyester and 1 to 15 percent by weight of said higher fatty acid wax.

11. An adhesive polyester film as set forth in claim 1, wherein said higher fatty acid wax is a wax composed mainly of a fatty acid ester compound formed from a higher fatty acid having 12 to 35 carbon atoms and an alcohol having 15 to 35 carbon atoms.

12. An adhesive polyester film as set forth in claim 11, wherein said alcohol is an alcohol having a valency of 1, 2 to 3.

13. An adhesive polyester film as set forth in claim 1, wherein said higher fatty acid wax is at least one member selected from the group consisting of shellac wax, bran wax, insect wax, wool wax, carnauba wax, montan wax and candelilla wax.

14. An adhesive polyester film as set forth in claim 1, wherein said higher fatty acid wax is at least one member selected from the group consisting of carnauba wax and montan wax.

15. An adhesive polyester film as set forth in claim 5, wherein 10 to 20 mole percent of component (A) is an alkali metal salt of an ester-forming aromatic sulfonic acid.

16. An adhesive polyester film as set forth in claim 5, wherein said component (A) includes at least one member selected from the group consisting of terephthalic acid, isophthalic acid, phthalic acid, 2,5-dimethylterephthalic acid, 1,4-naphthalene-dicarboxylic acid, biphenyldicarboxylic acid, 2,6-naphthalene-dicarboxylic acid, 1,2-bis(phenoxy)-ethane-p,p'-dicarboxylic acid, and ester-forming derivatives thereof.

17. An adhesive polyester film as set forth in claim 5, wherein said component (A) includes at least one member selected from the group consisting of alkali metal salts of sulfoterephthalic acid, 5-sulfosiophthalic acid, 4-sulfophthalic acid, 4-sulfonaphthalene-2,7-dicarboxylic acid, sulfo-p-xylene glycol, 2-sulfon-1,4-bis(hydroxyethoxy)-benzene, and ester-forming derivatives thereof.

18. An adhesive polyester film as set forth in claim 5, wherein said component (B) includes at least one glycol selected from the group consisting of ethylene glycol, 1,3-propane diol, 1,4-butane diol, and 1,4-cyclohexane.

19. An adhesive polyester film as set forth in claim 5, wherein the polyester base film is at least one member selected from the group consisting of polyethylene terephthalate, polytetramethylene terephthalate, poly-1,4-cyclohexylene-dimethylene terephthalate, polyethylene-2,6-naphthalene-dicarboxylate, and polyethylene-p-hydroxybenzoate.

20. An adhesive polyester film comprising:
a polyester base film comprising polyethylene terephthalate; and
a coating layer formed on one surface of said polyester base film, said coating layer comprising a mixture of
(1) a higher fatty acid wax comprising carnauba wax and
(2) a coating layer copolyester comprising a polycondensation product of (A) a dicarboxylic acid or ester component comprising 80 to 90 mole percent of terephthalic acid and 10 to 20 mole percent of 5-sodium sulfoisophthalate with (B) a glycol component comprising 95 to 100 mole percent of ethylene glycol and zero to 5 mole percent of diethylene glycol.

21. An adhesive polyester film as set forth in claim 20, wherein said higher fatty acid wax comprises montan wax.

22. An adhesive polyester film as set forth in claim 1, wherein said polyester film exhibits improved adhesiveness, anti-blocking property, and slipperiness.

23. An adhesive polyester film as set forth in claim 1, wherein said polyester film exhibits excellent adhesiveness, an anti-blocking property of less than about 270 g/12 cm$^2$, and a static friction coefficient of from about 0.8 to 1.0 $\mu$s measured at a temperature of 25 degrees Celcius and a relative humidity of 60 percent.

24. A magnetic recording medium comprising:
a magnetic layer which comprises a binder component, a curing agent component, and a magnetic powder component; and
an adhesive polyester film comprising a polyester base film and a coating layer formed on one surface of said polyester base film, said coating layer comprising a mixture of (1) a higher fatty acid wax and (2) a coating layer copolyester which includes as one comoner component an alkali metal salt of an ester-forming aromatic sulfonic acid.

* * * * *